United States Patent
Strutt (10) Patent No.: US 10,247,021 B2
(45) Date of Patent: Apr. 2, 2019

(54) HIGH TEMPERATURE SEALS FOR BLANKETLESS INNER FIXED STRUCTURE

(71) Applicant: Rohr, Inc., Chula Vista, CA (US)

(72) Inventor: Andrew John Strutt, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 103 days.

(21) Appl. No.: 15/372,076

(22) Filed: Dec. 7, 2016

(65) Prior Publication Data

US 2018/0156051 A1    Jun. 7, 2018

(51) Int. Cl.
| | | |
|---|---|---|
| *F01D 11/00* | (2006.01) | |
| *F16J 15/06* | (2006.01) | |
| *B64C 7/02* | (2006.01) | |
| *B64D 29/06* | (2006.01) | |
| *F02C 7/18* | (2006.01) | |
| *F02C 7/25* | (2006.01) | |
| *B64D 45/00* | (2006.01) | |

(52) U.S. Cl.
CPC ............ *F01D 11/003* (2013.01); *B64C 7/02* (2013.01); *B64D 29/06* (2013.01); *F02C 7/18* (2013.01); *F02C 7/25* (2013.01); *F16J 15/064* (2013.01); *B64D 2045/009* (2013.01); *F05D 2300/5024* (2013.01); *F05D 2300/6033* (2013.01)

(58) Field of Classification Search
CPC ........ F01D 11/003; F01D 25/12; F02K 1/805; F16J 15/064; F05D 2300/6033
See application file for complete search history.

(56) References Cited

U.S. PATENT DOCUMENTS

| | | | | |
|---|---|---|---|---|
| 2,130,017 A | * | 9/1938 | Lewis | F25D 23/087 220/DIG. 3 |
| 3,226,780 A | * | 1/1966 | Landis | E06B 7/2309 49/368 |
| 3,284,957 A | * | 11/1966 | Landis | B61D 19/00 49/493.1 |
| 3,371,445 A | * | 3/1968 | Herr | E06B 7/2309 49/368 |
| 3,562,957 A | * | 2/1971 | Landis | E06B 7/2309 49/479.1 |
| 3,591,963 A | * | 7/1971 | Kopp | B64D 27/26 277/646 |
| 4,468,043 A | * | 8/1984 | Brazel | F16J 15/065 277/651 |
| 4,627,655 A | * | 12/1986 | Collins | B60P 3/32 296/106 |
| 5,009,036 A | * | 4/1991 | Ryan | E06B 7/231 49/475.1 |
| 5,074,773 A | * | 12/1991 | Tischler | B29C 33/0038 249/65 |
| 5,934,613 A | * | 8/1999 | Standish | F02K 1/805 239/265.23 |
| 6,075,205 A | * | 6/2000 | Zhang | H05K 9/0015 174/358 |

(Continued)

*Primary Examiner* — Eugene G Byrd
(74) *Attorney, Agent, or Firm* — Snell & Wilmer, L.L.P.

(57) ABSTRACT

A method for installing an inner fixed structure (IFS) seal may comprise disposing a ceramic matrix composite (CMC) member over an inner skin of an IFS, disposing a seal retainer over the CMC member, and coupling the IFS seal to the seal retainer. The CMC member may be configured to thermally insulate the seal retainer from the IFS.

19 Claims, 6 Drawing Sheets

(56) References Cited

U.S. PATENT DOCUMENTS

| | | | |
|---|---|---|---|
| 6,921,086 B2* | 7/2005 | Selby | F16J 15/027 |
| | | | 277/609 |
| 7,487,616 B2* | 2/2009 | Deaver | B60J 10/08 |
| | | | 277/612 |
| 8,157,270 B2* | 4/2012 | Tsou | F01D 11/003 |
| | | | 277/644 |
| 8,640,825 B2 | 2/2014 | Vauchel et al. | |
| 8,899,512 B2 | 12/2014 | Vauchel et al. | |
| 8,974,891 B2 | 3/2015 | Riedell | |
| 9,175,607 B2 | 11/2015 | Welch | |
| 9,340,291 B2* | 5/2016 | Nestel | B64D 11/06 |
| 9,670,874 B2* | 6/2017 | Provost | F02K 1/566 |
| 2010/0044466 A1* | 2/2010 | Vauchel | F01D 11/005 |
| | | | 239/265.11 |
| 2012/0082808 A1 | 4/2012 | Lemains et al. | |
| 2012/0160933 A1 | 6/2012 | Vauchel et al. | |
| 2013/0004309 A1* | 1/2013 | Sambasivan | C04B 35/195 |
| | | | 415/208.1 |
| 2014/0345199 A1* | 11/2014 | Yahata | B64C 1/14 |
| | | | 49/475.1 |
| 2015/0098810 A1 | 4/2015 | Soria et al. | |
| 2015/0232190 A1 | 8/2015 | Provost | |

* cited by examiner

HIGH TEMPERATURE SEALS FOR BLANKETLESS INNER FIXED STRUCTURE

FIELD

The present disclosure relates to aircraft engine nacelle seals, and more particularly to aircraft engine nacelle seals with cooling systems and methods.

BACKGROUND

A nacelle for a turbine engine typically includes an inlet section, a fan cowl section, a thrust reverser section, and an exhaust section. The nacelle is typically mounted to a wing or a fuselage of an aircraft via a pylon. The thrust reverser section is typically split into two halves comprising inner fixed structure (IFS) halves. An upper bifurcation fire seal is usually required to be disposed between each of the IFS halves and the pylon. In a blanketless IFS, heat will be conducted into the base of the seal, via a seal retainer. Conventional elastomer seals are not normally designed to withstand engine operating temperatures over prolonged periods of operation.

SUMMARY

A seal cooling arrangement is disclosed herein, in accordance with various embodiments. A seal cooling arrangement may comprise a ceramic matrix composite (CMC) member coupled to an IFS, a seal retainer coupled to the CMC member, and an IFS seal coupled to the seal retainer.

In various embodiments, the CMC member may be configured to thermally insulate the seal retainer from the IFS. The CMC member may comprise an oxide CMC. The seal cooling arrangement may further comprise a fastener configured to couple at least one of the seal retainer and the CMC member to the IFS. The IFS seal may comprise a base portion and a slot disposed in the base portion configured to prevent contact between the fastener and the IFS seal. The IFS seal may comprise an upper bifurcation seal configured to form a seal between a pylon and the IFS. The CMC member may comprise a thermal conductivity of between 0.15 BTU/hr-ft-F and 0.35 BTU/hr-ft-F at 600° F. (0.26 W/mK and 0.61 W/mK at 316° C.). The CMC member may comprise an aluminosilicate fiber. The CMC member may be bonded to at least one of the seal retainer and the IFS.

A method for thermally insulating an inner fixed structure (IFS) seal is disclosed herein, in accordance with various embodiments. A method for thermally insulating an IFS seal may comprise disposing a ceramic matrix composite (CMC) member between an IFS and a seal retainer, and separating, by the CMC member, the IFS from the seal retainer, wherein the CMC member comprises a width corresponding to a dimension of the seal retainer, and the CMC member comprises a thickness configured to separate the seal retainer from the IFS.

In various embodiments, the CMC member may be configured to thermally insulate the seal retainer from the IFS. The IFS seal may comprise an upper bifurcation seal configured to form a seal between a pylon and the IFS. The CMC member may be configured to prevent a thermal load from being transferred from the IFS to the IFS seal. The thickness of the CMC member may comprise between 0.2 inches and 1 inch. The CMC member may comprise a thermal conductivity of between 0.15 BTU/hr-ft-F and 0.35 BTU/hr-ft-F at 600° F. (0.26 W/mK and 0.61 W/mK at 316° C.). The CMC member may comprise an aluminosilicate fiber.

A method for thermally insulating an inner fixed structure (IFS) seal is disclosed herein, in accordance with various embodiments. A method for thermally insulating an inner fixed structure (IFS) seal may comprise receiving, by an IFS, a thermal load from an engine, and thermally insulating, by a CMC member, the thermal load from a seal retainer, wherein the CMC member comprises a width corresponding to a dimension of the seal retainer, and the CMC member comprises a thickness configured to separate the seal retainer from the IFS.

In various embodiments, the CMC member may comprise an oxide CMC. The IFS seal may comprise an upper bifurcation seal configured to form a seal between a pylon and the IFS. The thickness of the CMC member may comprise between 0.2 inches and 1 inch.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading and/or crosshatching lines may be used throughout the figures to denote different parts, but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Seal assemblies, as described herein, may provide cooling to a seal to prevent the seal from failing due to thermal loading. A seal arrangement may include a ceramic matrix composite (CMC) member disposed between an inner fixed structure (IFS) and a seal. The thermal properties of CMCs are a result of their constituents, namely fibers, matrix and pores, as well as their composition. CMCs, including oxide CMCs, may provide thermal insulation to adjacent members. Therefore, providing a layer of CMC between the IFS and the seal may prevent the seal from overheating.

Figure 2:
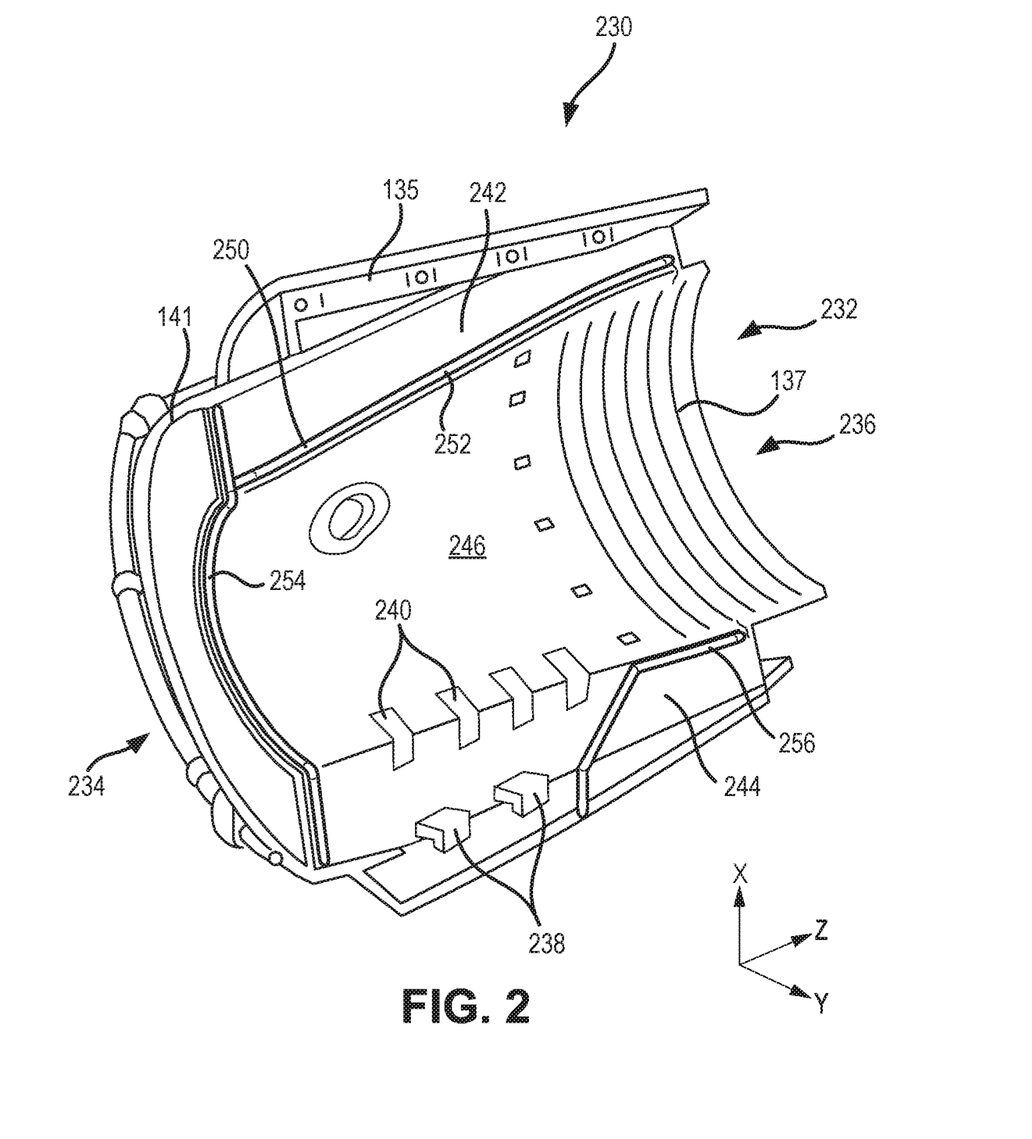
FIG. 2 illustrates a perspective inside view of an inner fixed structure (IFS) with an IFS seal, in accordance with various embodiments.

With respect to FIG. 3 through FIG. 6B, elements with like element numbering, as depicted in FIG. 2, are intended to be the same and will not necessarily be repeated for the sake of clarity. With respect to FIG. 5A through FIG. 6B, elements with like element numbering, as depicted in FIG. 4A, are intended to be the same and will not necessarily be repeated for the sake of clarity. Xyz-axes are provided in the figures described herein for ease of illustration.

Figure 1A:
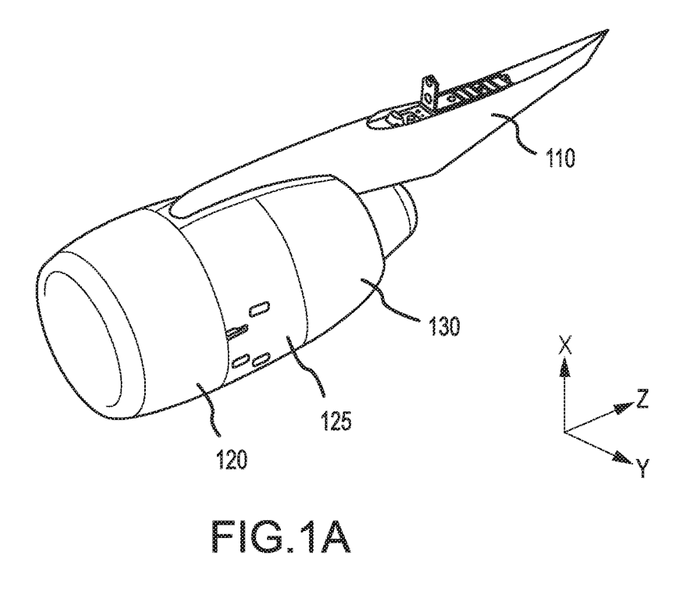
FIG. 1A illustrates a perspective view of a propulsion system and its elements, in accordance with various embodiments.
Figure 1B:
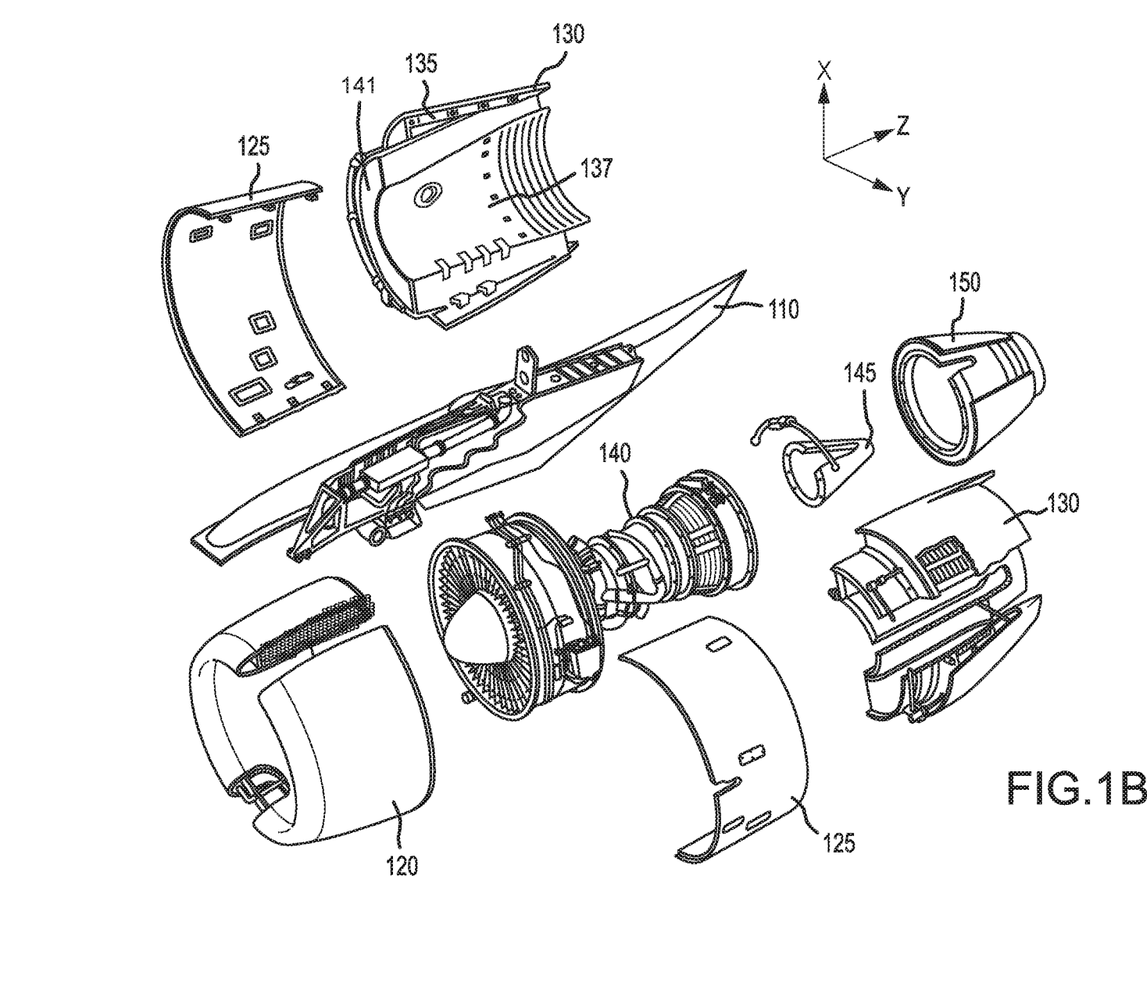
FIG. 1B illustrates an exploded view of the propulsion system and its elements of FIG. 1A, in accordance with various embodiments.

With reference to FIGS. 1A and 1B, a turbofan propulsion system for a commercial jetliner may include an engine 140, pylon 110, and nacelle package. The typical nacelle package, or more simply a nacelle, may comprise an inlet 120, a fan cowl 125, a thrust reverser 130, and an exhaust system including an exhaust cone 145, and exhaust nozzle 150. The nacelle surrounds the engine providing smooth aerodynamic surfaces for airflow around and into the engine. The nacelle also helps define a bypass air duct through the propulsion system.

A fan draws and directs a flow of air into and through the propulsion system. After the fan, the air is divided into two principal flowpaths, one flowpath through the engine core, and another flowpath through a bypass air duct. The engine core flowpath is directed into the engine core and initially passes through a compressor that increases the air flow pressure, and then through a combustor where the air is mixed with fuel and ignited. The combustion of the fuel and air mixture causes a series of turbine blades at the rear of the engine core to rotate, and to drive the engine's rotor and fan. The high-pressure exhaust gases from the combustion of the fuel and air mixture are thereafter directed through an exhaust nozzle at the rear of the engine for thrust.

The bypass air flowpath includes air that is directed around the engine core in a duct or ducts defined by the nacelle. The bypass air exits the duct at a nozzle at the aft end of the nacelle for thrust. In turbofan engines, the bypass flow typically provides a large percentage of the thrust for an aircraft. The bypass air ducts in the nacelle may be C-shaped, and may be principally defined by the exterior surface of the inner fixed structure (IFS) 137 and the inside surface of the outer sleeve 141. If the nacelle includes a typical thrust reverser, the thrust reverser (in a deployed mode) blocks bypass air in the bypass air duct from reaching the nozzle, and instead redirects the bypass air to exit the duct in a forward direction of the aircraft to generate reverse thrust.

The engine 140 may be mounted to pylon 110 in two places. One of these at the aft end of the pylon 110, over the engine turbine case, and in one of two places at the forward end of pylon 110: the engine core (core mount) or the engine fan case (fan mount). Pylon 110 transmits structural loads (including thrust) between engine 140 and a wing.

The thrust reverser 130 may comprise two halves generally configured to surround the engine core. The thrust reverser 130 may be hinged to the pylon 110 via one or more hinges. The thrust reverser 130 comprises an IFS 137 and an outer sleeve 141. The IFS generally surrounds the engine core. As used herein, the outer sleeve 141, though it may have any shape, may generally be a C shaped structure. An exterior surface of the outer sleeve is external to the nacelle. An interior surface of the outer sleeve 141, along with the IFS 137, partially defines a cold flow path of the propulsion system of the aircraft. The IFS 137 and the outer sleeve 141 are typically coupled together and attached to the pylon 110 via a hinge beam 135. As used herein, the IFS 137 is generally referred to as an IFS; however it should be appreciated that a first IFS half may be configured to partially surround an engine core and a second IFS half may be configured to substantially partially surround the remaining engine core.

With reference to FIG. 2, thrust reverser half 230 which exposes a first IFS half 232 of an IFS formed in two "clam-shell" halves, only one clam-shell half being shown, is illustrated, in accordance with various embodiments. It is understood that the unseen second section is substantially a mirror image of first IFS half 232. The IFS section has a forward end 234 and an aft end 236. The IFS halves may be connected together by latches 238 at the bottom and hinged to the pylon 110 (see FIG. 1A through FIG. 2B) at the top. Bumpers 240 may provide a structural bridge between the gaps that separates the two IFS halves. The structural bridge may provide a hoop load path to resist the crushing pressure of the fan air stream upon the barrel sections and bifurcations.

The IFS illustrated in FIG. 2 may encase portions of the engine assembly located between the engine fan case and the nozzle. The IFS may be configured to create an aerodynamically smooth path for air, and a fire and heat boundary by enclosing portions of the engine assembly.

In various embodiments, IFS 137 may comprise a metal or metal alloy. IFS 137 may comprise titanium, or an alloy thereof. The IFS 137 may be a blanketless IFS, in which a thermal blanket is not coupled to the IFS 137. Stated differently, the inner skin of IFS 137 may be directly exposed to thermal loads from engine 140.

In various embodiments, the first IFS half 232 may have an upper bifurcation wall portion 242, a lower bifurcation wall portion 244 and inner barrel portion 246 formed between the two wall portions 242, 244.

In various embodiments, a seal 250 may be coupled to first IFS half 232. Seal 250 may comprise an upper bifurcation seal 252 and a forward edge seal 254. Upper bifurcation seal 252 may extend over first IFS half 232 in close proximity to the joint between upper bifurcation wall portion 242 and inner barrel portion 246. Forward edge seal 254 may extend along the forward end 234 of first IFS half 232. Seal 250 may further include a lower bifurcation seal 256. Seal 250 may seal the engine core to shield various components of the nacelle assembly from heat produced by the engine during and after engine operation. Seal 250 may comprise a fire seal in that seal 250 may be resistant to fire. Seal 250 may be configured to prevent the spread of combustion in the event of an engine fire.

Figure 3:
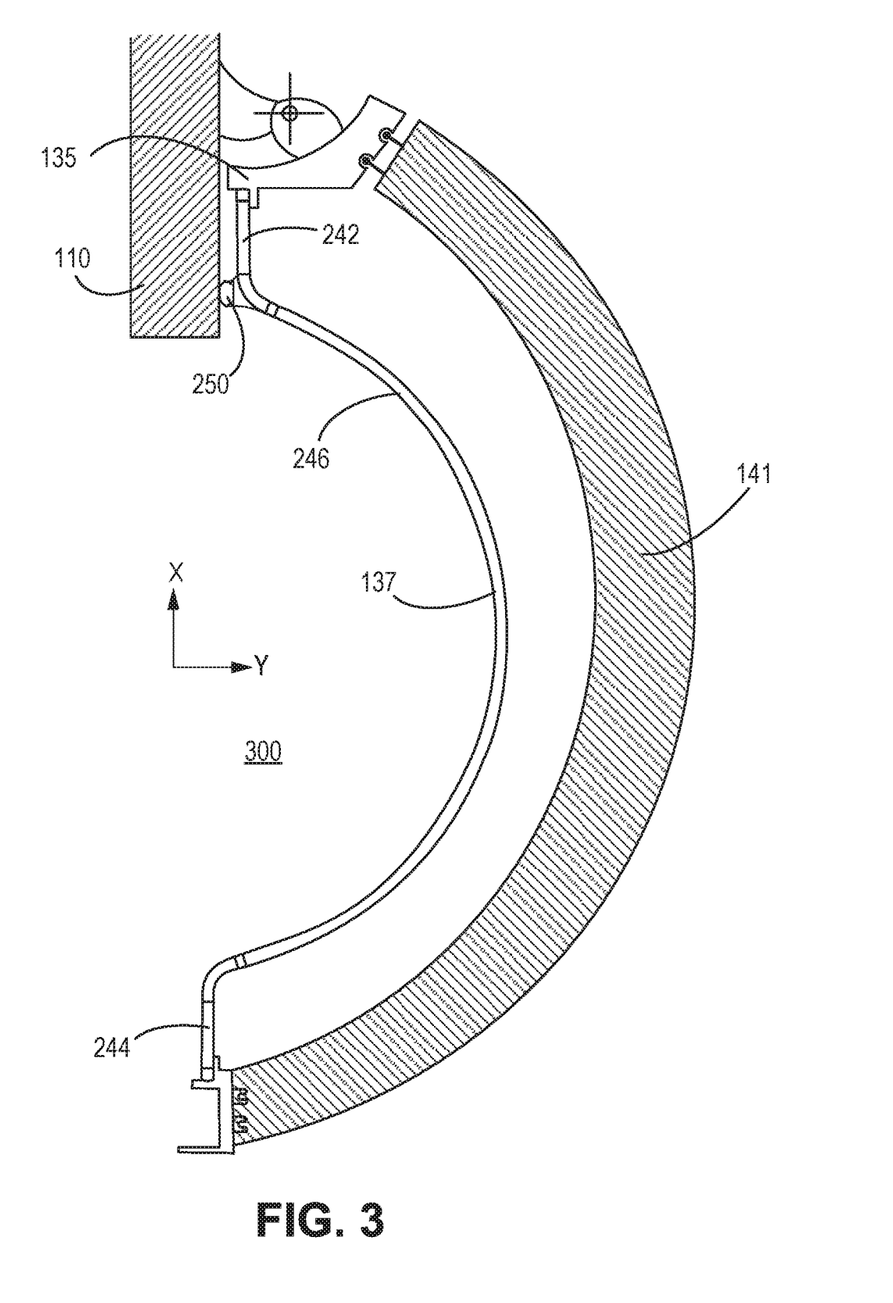
FIG. 3 illustrates a cross-section view of an IFS, and an outer sleeve hingeably coupled to a pylon via a hinge beam, in accordance with various embodiments.

With reference to FIG. 3, IFS 137 and outer sleeve shape, and the manner in which they may be attached to pylon 110, is illustrated, in accordance with various embodiments. The IFS 137 may be attached to a hinge beam 135. The hinge beam 135 may form half of a hinge joint with structure attached to the pylon 110. The outer sleeve 141 may also be mounted to the hinge beam 135. For example, the hinge beam may include a pair of tracks that mount the outer sleeve so that the outer sleeve can slide axially aft during thrust reverser deployment. In various embodiments, seal 250 may make contact with pylon 110 and form a seal between pylon 110 and IFS 137. IFS 137 may at least partially define an engine core compartment 300.

Figure 4A:
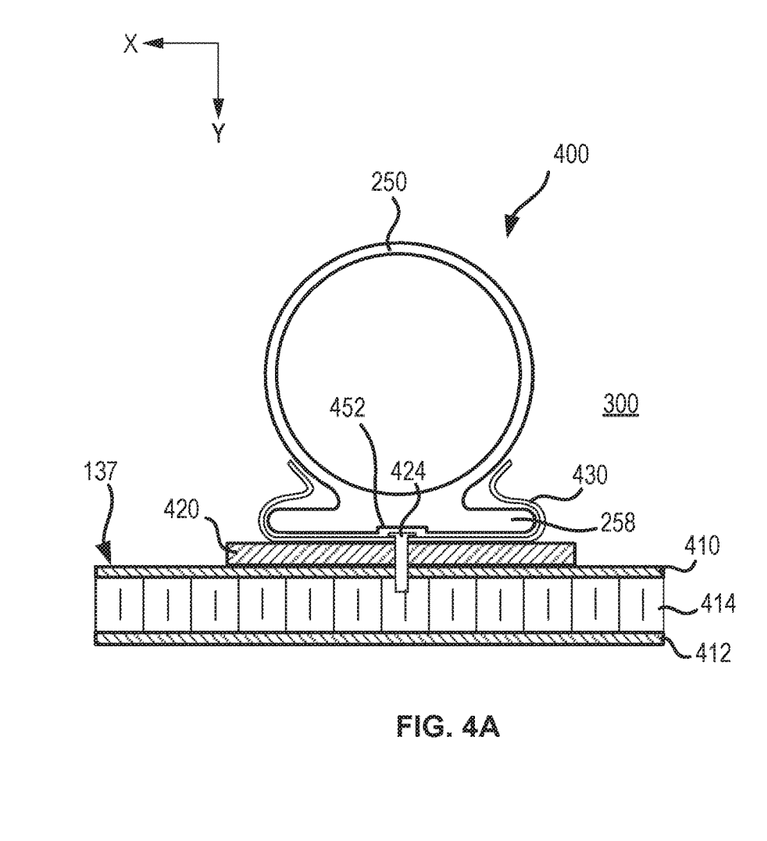
FIG. 4A and FIG. 4B illustrate a cross section view and a partial cross section side view, respectively, of a seal arrangement, in accordance with various embodiments.
Figure 4B:
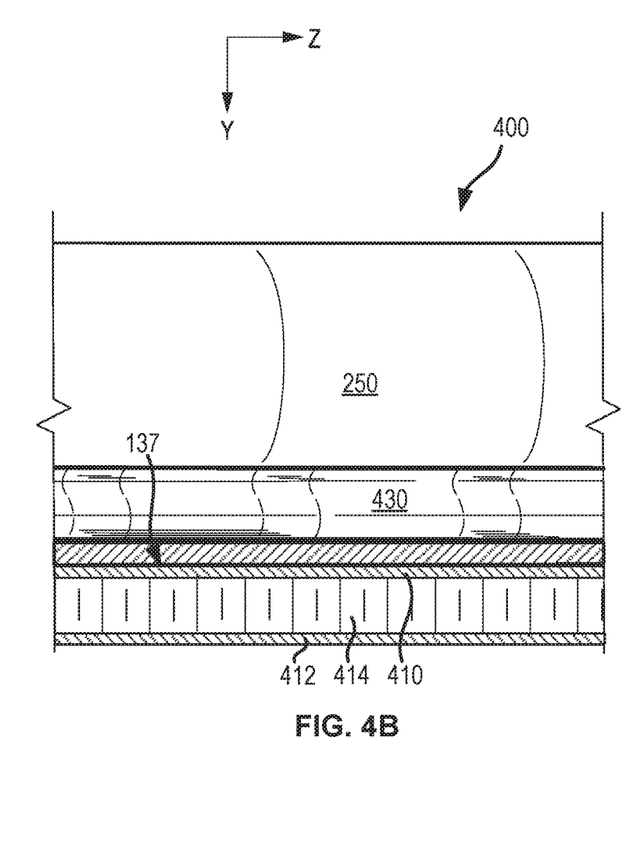

With reference to FIG. 4A and FIG. 4B, a seal arrangement (also referred to herein as a seal cooling arrangement) 400 is illustrated, in accordance with various embodiments. Seal arrangement 400 may include CMC member 420, seal retainer 430, and seal 250. Seal retainer 430 may comprise a sheet of metal shaped to partially house and retain seal 250 with respect to CMC member 420. Seal retainer 430 may house base portion 258 of seal 250. Seal retainer 430 may comprise a metal or metal alloy such as steel, stainless steel, nickel alloy, or any other suitable high temperature metal or metal alloy. Seal retainer 430 may be coupled to CMC member 420. A fastener 424 may fasten seal retainer 430 to IFS 137. Fastener 424 may fasten CMC member to IFS 137. Fastener 424 may comprise a rivet, a screw, or the like. However, in various embodiments, fastener 424 may be omitted and seal retainer 430 may be glued or otherwise bonded to CMC member 420 and CMC member 420 glued or otherwise bonded to inner skin 410.

In various embodiments, IFS 137 may comprise an inner skin 410, and outer skin 412, and a cellular core 414. Cellular core 414 may comprise core cells defined by cell walls.

In various embodiments, seal 250 may be hollow. Seal 250 may comprise a fiber reinforced polymeric material. Seal 250 may be capable of withstanding temperatures of up to 350° F. (121.1° C.). An engine operating within engine core compartment 300 may be capable of heating IFS 137 above 350° F. (121.1° C.). Thus, thermally insulating seal 250 via CMC member 420 may prevent heat from being transferred to seal 250 from IFS 137. In this regard, seal arrangement 400 may be configured to thermally insulate seal 250 to prevent seal 250 from heating above a threshold temperature. CMC member 420 may be configured to thermally insulate seal retainer 430 and seal 250 from IFS 137.

In various embodiments, a slot 452 may be disposed in the base portion of seal 250. Slot 452 may accommodate fastener 424. In this regard, slot 452 may form a cavity between seal 250 and seal retainer 430 to prevent seal 250 from contacting fastener 424. In this manner, the transfer of heat between fastener 424 and seal 250 may be prevented.

In various embodiments, CMC member may comprise a width (as measured in the x-direction) corresponding to a dimension or width (as measured in the x-direction) of seal retainer 430. For example, the width of CMC member 420 may be equal to or greater than a dimension, or width, of seal retainer 430. CMC member 420 may comprise a thickness (as measured in the y-direction). In various embodiments, CMC member may be between 0.2 inches (0.508 cm) and 1 in. (2.54 cm) thick, and in various embodiments, between 0.4 in. and 0.8 in. (2.032 cm) thick, and in various embodiments, between 0.5 in. (1.27 cm) and 0.7 in (1.778 cm) thick, and in various embodiments, about 0.6 in. (1.524 cm) thick, wherein the term "about" in this regard means±0.05 inches. In various embodiments, the density of CMC member 420 may be about 2.8 $g/cm^3$. CMC member 420 may comprise an aluminosilicate fiber. CMC member 420 may comprise an alumina matrix CMC. In various embodiments, CMC member 420 may comprise one or more sheets of CMC material, such as an oxide CMC material sold under the trademark of Nextel™ 610. For example, CMC member 420 may comprise one or more layers of CMC. CMC member 420 may be laid up in a composite laying process. The oxide CMC material may comprise a thermal conductivity of between 0.15 BTU/hr-ft-F and 0.35 BTU/hr-ft-F at 600° F. (0.26 W/mK and 0.61 W/mK at 316° C.), and in various embodiments, a thermal conductivity of between 0.20 BTU/hr-ft-F and 0.30 BTU/hr-ft-F at 600° F. (0.35 W/mK and 0.52 W/mK at 316° C.), and in various embodiments, a thermal conductivity of about 0.24 BTU/hr-ft-F at 600° F. (0.415 W/mK at 316° C.), wherein the term "about" in this regard means±0.02 BTU/hr-ft-F.

Figure 5:
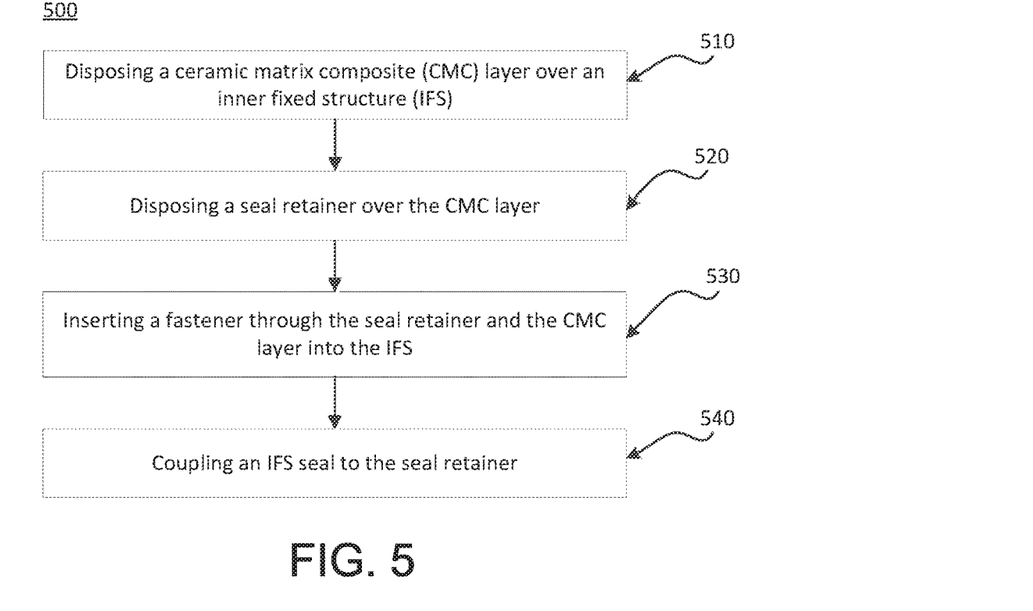
FIG. 5 illustrates a method for installing an IFS seal, in accordance with various embodiments.

With reference to FIG. 5, a method 500 for installing an IFS seal is illustrated, in accordance with various embodiments. Method 500 includes disposing a CMC member over an IFS (step 510). Method 500 includes disposing a seal retainer over the CMC member (step 520). Method 500 may include inserting a fastener through the seal retainer and the CMC member into the IFS (step 530). Method 500 coupling an IFS seal to the seal retainer (step 540).

With combined reference to FIG. 4A, FIG. 4B, and FIG. 5, step 510 may include disposing CMC member 420 over inner skin 410 of IFS 137. Step 520 may include disposing seal retainer 430 over CMC member 420. Step 530 may include inserting fastener 424 through seal retainer 430 and CMC member 420 into IFS 137. Step 540 may include coupling seal 250 to seal retainer 430. Coupling seal 250 to seal retainer 540 may include pressing seal 250 into seal retainer 430.

Figure 6:
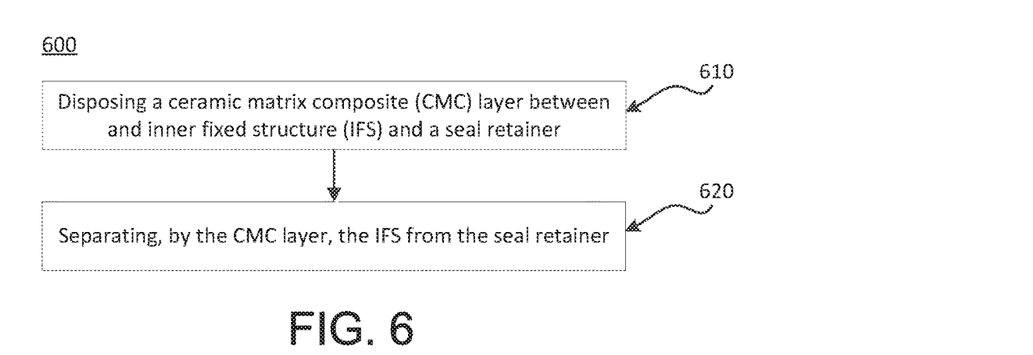
FIG. 6 illustrates a method for thermally insulating an IFS seal, in accordance with various embodiments.

With reference to FIG. 6, a method 600 for thermally insulating an IFS seal is illustrated, in accordance with various embodiments. Method 600 may include disposing a CMC member between an IFS and a seal retainer (step 610). Method 600 may include separating, by the CMC member, the seal retainer from the IFS (step 620).

With combined reference to FIG. 4A, FIG. 4B, and FIG. 6, step 610 may include disposing CMC member 420 between IFS 137 and the seal retainer 430. Step 620 may include physically and/or thermally separating, by CMC member 420, the seal retainer 430 from the IFS 137.

Figure 7:
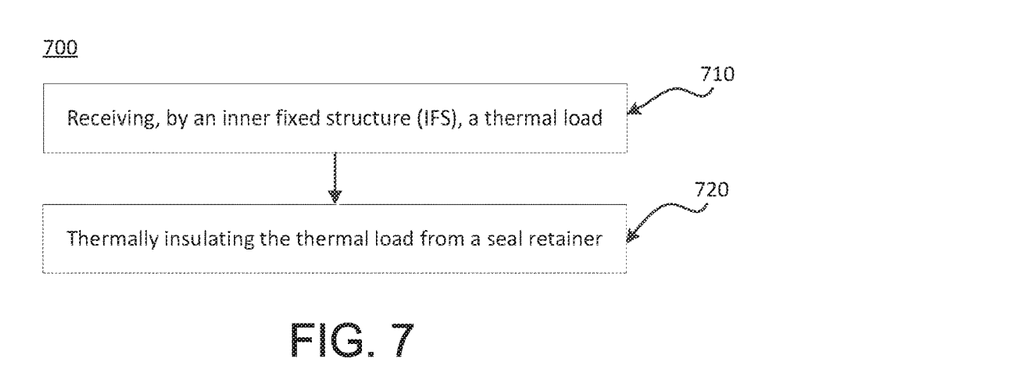
FIG. 7 illustrates a method for thermally insulating an IFS seal, in accordance with various embodiments.

With reference to FIG. 7, a method 700 for thermally insulating an IFS seal is illustrated, in accordance with various embodiments. Method 700 may include receiving, by an IFS, a thermal load (step 710). Method 700 may include thermally insulating the thermal load from a seal retainer (step 720).

With combined reference to FIG. 1B, FIG. 4A, FIG. 4B, and FIG. 7, step 710 may include receiving, by IFS 137, a thermal load from an engine 140. For example, heat may radiate from engine 140 during operation and impinge upon IFS 137. Step 720 may include thermally insulating, by CMC member 420, the thermal load from seal retainer 430.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A seal cooling arrangement comprising:
   an inner fixed structure (IFS) comprising an upper bifurcation wall portion, a lower bifurcation wall portion, and an inner barrel portion formed between the upper bifurcation wall portion and the lower bifurcation wall portion, wherein an inner surface of the IFS is directly exposed to thermal loads from an engine;
   a ceramic matrix composite (CMC) member coupled to the inner surface of the IFS;
   a seal retainer coupled to the CMC member, wherein the CMC member is configured to thermally insulate the seal retainer from the IFS; and
   an IFS seal coupled to the seal retainer,
   wherein the CMC member comprises a width corresponding to a dimension of the seal retainer, and
   the CMC member comprises a thickness configured to separate the seal retainer from the IFS.

2. The seal cooling arrangement of claim 1, wherein the CMC member comprises an oxide CMC.

3. The seal cooling arrangement of claim 2, further comprising a fastener configured to couple at least one of the seal retainer and the CMC member to the IFS.

4. The seal cooling arrangement of claim 3, wherein the IFS seal comprises a base portion and a slot disposed in the base portion configured to prevent contact between the fastener and the IFS seal.

5. The seal cooling arrangement of claim 2, wherein the IFS seal comprises an upper bifurcation seal configured to form a seal between a pylon and the IFS, the CMC member coupled to the upper bifurcation wall portion.

6. The seal cooling arrangement of claim 5, wherein the CMC member comprises a thermal conductivity of between 0.15 BTU/hr-ft-F and 0.35 BTU/hr-ft-F at 600° F. (0.26 W/mK and 0.61 W/mK at 316° C.).

7. The seal cooling arrangement of claim 6, wherein the CMC member comprises an aluminosilicate fiber.

8. The seal cooling arrangement of claim 2, wherein the CMC member is bonded to at least one of the seal retainer and the IFS.

9. A method for thermally insulating an inner fixed structure (IFS) seal comprising:
   disposing a ceramic matrix composite (CMC) member between an inner surface of an IFS and a seal retainer; and
   separating, by the CMC member, the IFS from the seal retainer,
   wherein the CMC member comprises a width corresponding to a dimension of the seal retainer,
   the CMC member comprises a thickness configured to separate the seal retainer from the IFS,
   the CMC member is configured to thermally insulate the seal retainer from the IFS, and
   the IFS comprises an upper bifurcation wall portion, a lower bifurcation wall portion, and an inner barrel portion formed between the upper bifurcation wall portion and the lower bifurcation wall portion, wherein the inner surface of the IFS is directly exposed to thermal loads from an engine.

10. The method of claim 9, wherein the IFS seal comprises an upper bifurcation seal configured to form a seal between a pylon and the IFS, the CMC member coupled to the upper bifurcation wall portion.

11. The method of claim 10, wherein the CMC member is configured to prevent a thermal load from being transferred from the IFS to the IFS seal.

12. The method of claim 11, wherein the thickness of the CMC member comprises between 0.2 inches and 1 inch.

13. The method of claim 12, wherein the CMC member comprises a thermal conductivity of between 0.15 BTU/hr-ft-F and 0.35 BTU/hr-ft-F at 600° F. (0.26 W/mK and 0.61 W/mK at 316° C.).

14. The method of claim 13, wherein the CMC member comprises an aluminosilicate fiber.

15. A method for thermally insulating an inner fixed structure (IFS) seal comprising:
   receiving, by an IFS, a thermal load from an engine; and
   thermally insulating, by a CMC member, the thermal load from a seal retainer,
   wherein the CMC member comprises a width corresponding to a dimension of the seal retainer, the CMC member comprises a thickness configured to separate the seal retainer from the IFS, and the CMC member is configured to thermally insulate the seal retainer from the IFS, and the IFS comprises an upper bifurcation wall portion, a lower bifurcation wall portion, and an inner barrel portion formed between the upper bifurcation wall portion and the lower bifurcation wall portion, wherein an inner surface of the IFS is directly exposed to the thermal load.

16. The method of claim 15, wherein the CMC member comprises an oxide CMC.

17. The method of claim 16, wherein the IFS seal comprises an upper bifurcation seal configured to form a seal between a pylon and the IFS, the CMC member coupled to the upper bifurcation wall portion.

18. The method of claim 17, wherein the thickness of the CMC member comprises between 0.2 inches and 1 inch.

19. The seal cooling arrangement of claim 1, wherein the IFS is blanketless.

* * * * *